United States Patent

[11] 3,574,414

[72] Inventor Keith D. Jacob
    2321 South Circle Drive, Ann Arbor, Mich. 48103
[21] Appl. No. 768,062
[22] Filed Oct. 16, 1968
[45] Patented Apr. 13, 1971

[54] BRAKE CONTROL SYSTEM FOR A TRACTOR DRAWN TRAILER
    8 Claims, 6 Drawing Figs.
[52] U.S. Cl. .................................................. 303/7,
    188/3, 303/3, 303/15, 303/20, 338/47, 338/108
[51] Int. Cl. ................................................ B60t 13/74
[50] Field of Search ....................................... 303/7—8,
    2—3, 13, 15, 16—17, 20; 188/3; 338/47, 99, 108; 323/(Inquired)

[56] References Cited
    UNITED STATES PATENTS

| | | | | |
|---|---|---|---|---|
| 3,135,358 | 6/1964 | Greentree | | 188/3 |
| 2,091,086 | 8/1937 | Taylor | | 338/108X |
| 2,169,668 | 8/1939 | Thomas | | 303/7X |
| 3,125,739 | 3/1964 | Deibel et al. | | 338/99 |
| 3,350,142 | 10/1967 | Schuman | | 303/7 |
| 3,423,135 | 1/1969 | Beltrano | | 303/7X |

*Primary Examiner*—Milton Buchler
*Assistant Examiner*—John J. McLaughlin, Jr.
*Attorneys*—Marmaduke A. Hobbs, Maurice W. Green and Kemon, Palmer and Estabrook

ABSTRACT: The electric brakes of a tractor drawn trailer are controlled by a force sensor so positioned that pressure applied by the foot of the driver during actuation of the tractor brake pedal also operates the sensor. The electrical system thus activated is independent of the tractor braking system. Solid state devices are used in preference to switches or contractors, and included are effective means for voltage control. Such arrangement provides adjustable braking force proportional to the tractor braking force, relative braking adjustment, variable maximum braking, and automatic operation after adjustment.

PATENTED APR 13 1971

INVENTOR.
KEITH D. JACOB
BY Hobbs & Green
ATTORNEYS

BRAKE CONTROL SYSTEM FOR A TRACTOR DRAWN TRAILER

The importance of reliable braking for trailer type vehicles, particularly for those of the type used on the highways, has increased with traffic. The brakes for the trailer, if properly actuated and controlled with a system independent of the tractor or automobile, would offer a very satisfactory solution to many problems of trailer use. The importance of independence while retaining relative control between the tractor and trailer brake system has been emphasized by experience with prior art devices wherein failure of one system has resulted in failure of the other. Lack of control and adjustment of the trailer braking force relative to that of the tractor, has led to difficulty in maneuvering the tractor-trailer as a unit.

The present invention provides a brake control system for trailer brakes comprising a source of brake power independent of the tractor brakes, but including means responsive to force applied by the foot of the driver actuation of the tractor brake pedal, thus providing means to activate an electrical system which has elements for proportional control and regulation in the actuation of the trailer brakes.

It is a primary object of this invention to provide a trailer braking system which is safe, reliable, and independent of the tractor braking system.

Another object is to provide means by which trailer braking force is controlled and is proportional to tractor braking force and which can be simply adjusted by the driver relative to tractor braking force.

It is a further object to provide a force control in combination with an electrical system for actuating a control element wherein the force control is a pressure sensitive device accomplishing electrical circuit activation by pressure on a sandwich of contacting elements with no outwardly visible relative motion therebetween.

The objects and advantages of the invention, in addition to those set forth hereinabove, will become apparent from the following description and accompanying drawings.

Figure 1:
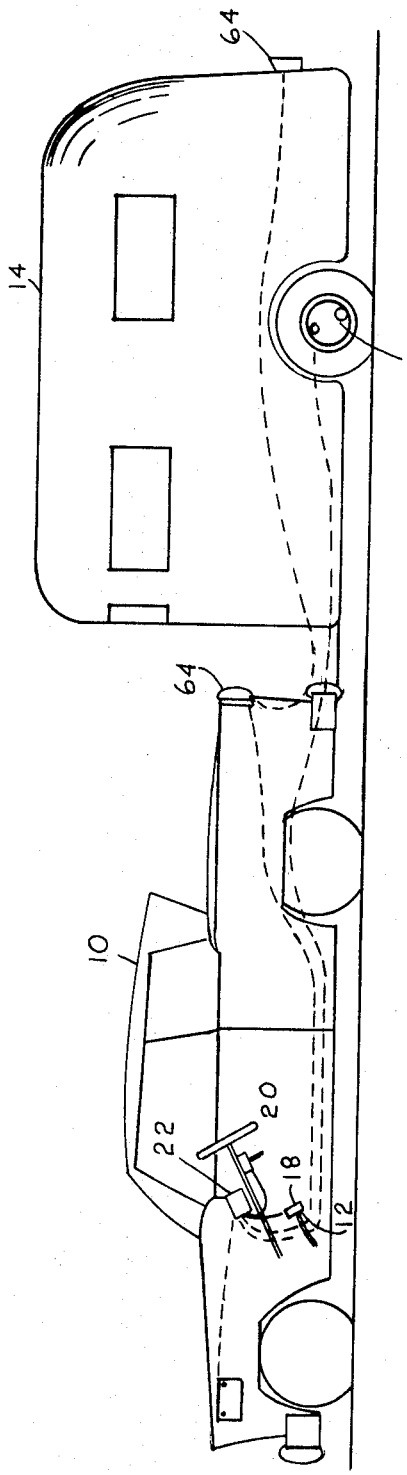
FIG. 1 is a side view of a tractor and trailer assembly with a diagrammatic showing of several of the elements of the brake control system and the connections therebetween.

Referring to FIGS. 1 to 4, an automobile-trailer assembly, as illustrated, represents one form of tractor-trailer assembly to which the invention is applicable. The automobile 10 has its own conventional hydraulic brake system which is activated by force on the brake pedal 12. The trailer 14 has electric brakes 16 which may be considered as conventional, and which form only one element of the tractor-trailer braking system. The system is illustrated here as having three components; a force sensor 18, mounted on the tractor hydraulic brake pedal 12, a manual control 20 mounted on the steering column, and an amplifier package 22 mounted under the dash. The manual control 20 could be mounted under the dash or be incorporated into the amplifier package 22. The manual control 20 comprises a lever 24 to rotate the shaft of variable resistor 26 and also activate an emergency switch 28 in case of failure of the amplifier 22. Spring 32 maintains the lever 24 in the off position, and operation of the lever 24 is against the tension of spring 32. The switch 28, because of its leaf spring design, requires a much greater force to operate than that required to compress spring 32, allowing the operator to feel by the increased resistance to motion of the lever that he is at maximum braking, and further motion will connect the battery 34 directly to the trailer brakes 16.

Figure 3:
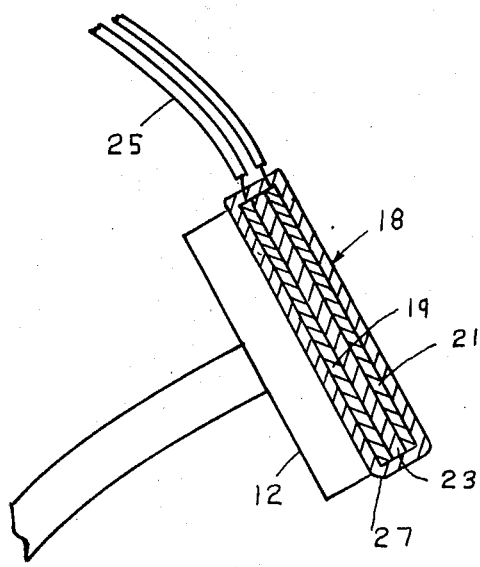
FIG. 3 is a side view partly in section showing the tractor brake pedal, with the pressure sensor attached thereto in position to have force applied by the foot of the tractor driver.
Figure 5:
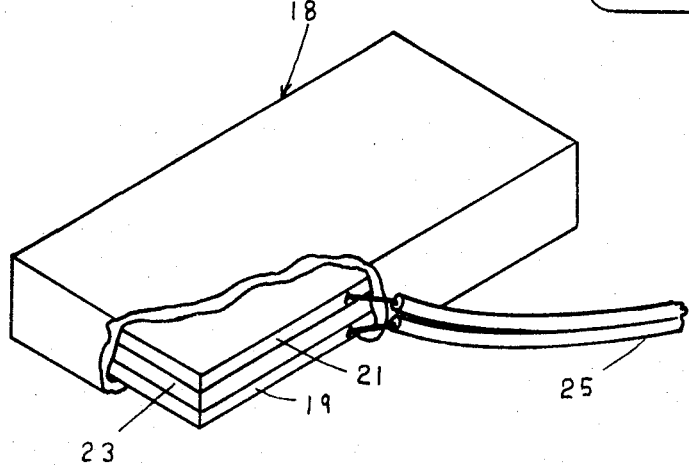
FIG. 5 is a perspective view partly broken away, showing the force sensor.

Referring to FIGS. 3 and 5, the force sensor 18 is made with two conductive plates 19 and 21 separated by a layer of conductive resin 23. A two-conductor cable 25 is connected with one conductor to plate 19 and the other to plate 21. The resin 23 is of a type known in the art, which increases electrical resistance with pressure imposed by the plates 19 and 21 which would occur from the pressure of the foot of the driver actuating the brake pedal 12. The force sensor 18 is protected by a durable nonconductive coating 27.

The conductive resin 23 is one of the materials available in the art which increase their resistance with increased pressure. Other materials available decrease their resistance with pressure.

Figure 2:
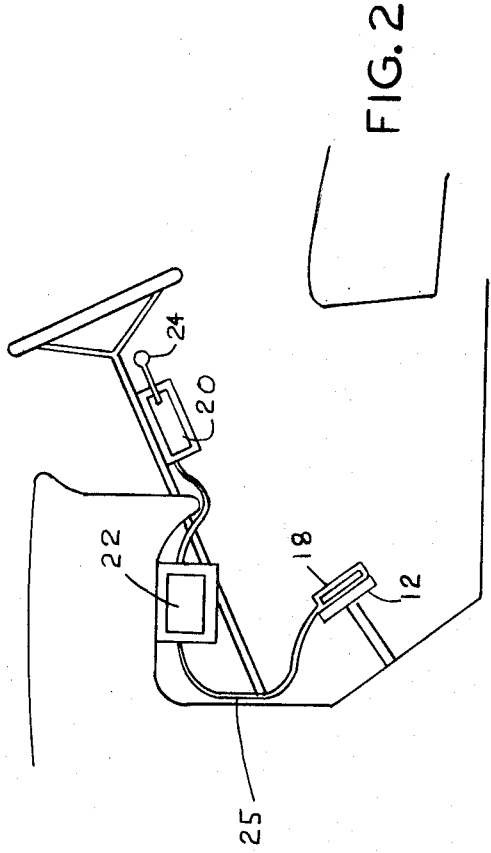
FIG. 2 is a side view partly in section showing an installation in a car or other tractor, and illustrating the relationship as to relative positions of the pressure sensor, and certain other components of the system adjacent the driver's seat.
Figure 4:
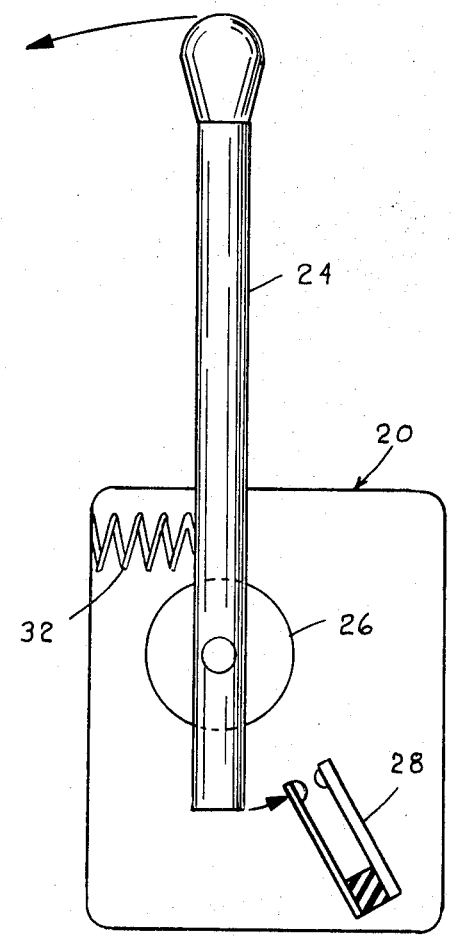
FIG. 4 is a side view of the manual control device which is used when it is desired to operate the trailer brake system without the force sensor.
Figure 6:
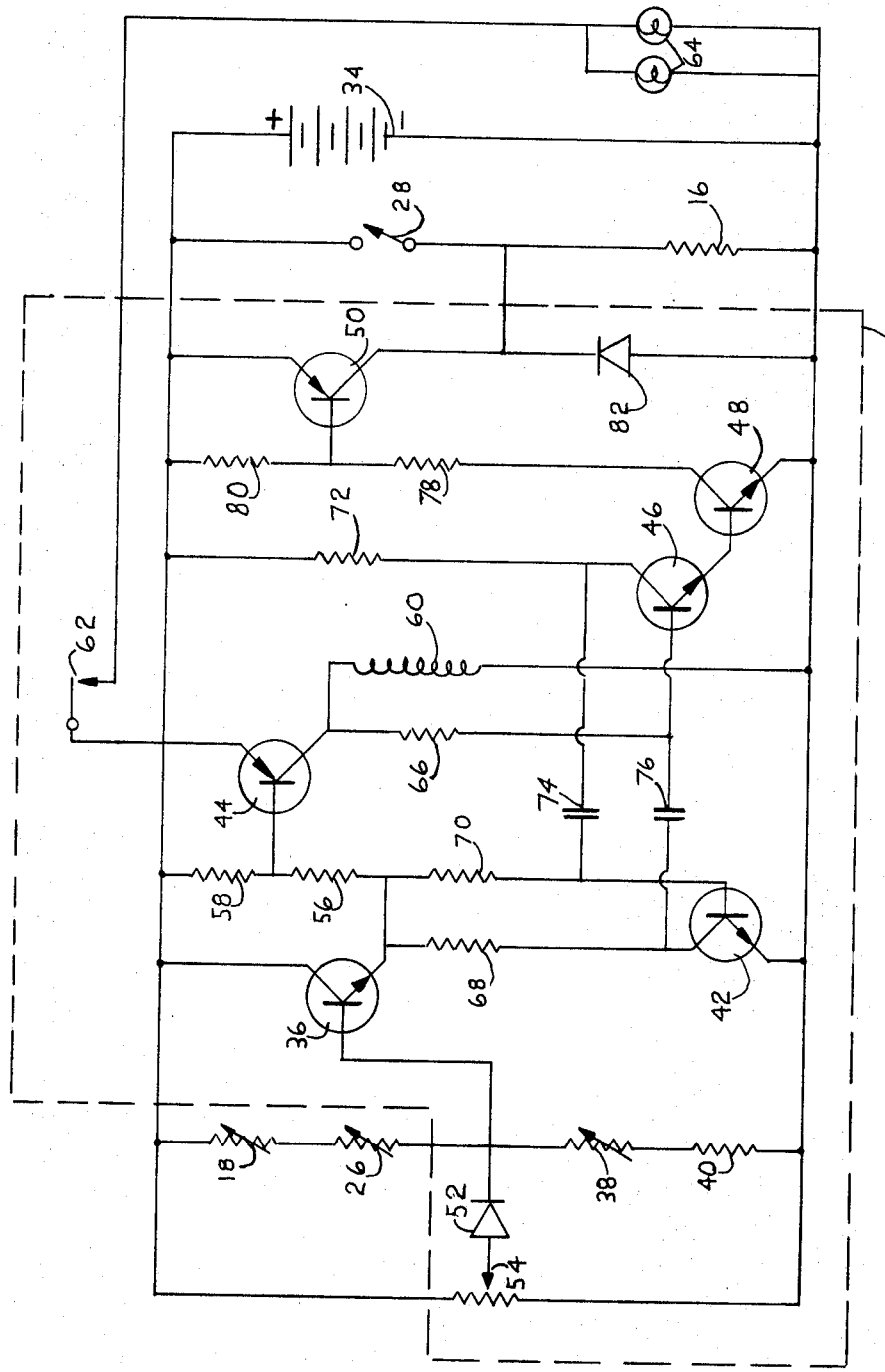
FIG. 6 is a schematic diagram of the system including the electrical circuits, with the sensor, manual control, tractor battery, and trailer brakes, as well as other components, shown diagrammatically.

Referring to the diagrammatic showing in FIG. 6, it is noted that the box made by broken lines indicated by numeral 22 encloses the elements which make up the so-called amplifier package 22. It is noted also that the force sensor 18 and variable resistor 26 of the manual control 20 are outside the amplifier package 22 and have been described hereinabove and are shown in FIGS. 2, 3 and 4. Battery 34, which is the car or tractor battery, is also located outside the amplifier package 22, as well as emergency switch 28 illustrated in FIG. 4. The road wheel located electrical element 16 of the trailer brakes, which may be of the electromagnetic type known in the art, is also outside the package 22. The remainder of the elements shown in FIG. 6 within the block marked 22 are included in the amplifier package.

Components, some of which were not previously mentioned herein and which are shown connected in the multicomponent electrical circuit diagram of FIG. 6, are identified as follows:

| Resistor No.: | Value (ohms) |
| --- | --- |
| 16 | 1 |
| 18 | 500 to 50,000 |
| 26 | 500 to 50,000 |
| 38 | 500 to 25,000 |
| 40 | 7,000 |
| 54 | 5,000 |
| 56 | 22,000 |
| 58 | 10,000 |
| 66 | 100,000 |
| 68 | 1,000 |
| 70 | 220,000 |
| 72 | 500 |
| 78 | 25 |
| 80 | 100 |

| Capacitor No.: | Value (mfd.) |
| --- | --- |
| 74 | .47 |
| 76 | .047 |

| Transitor No.: | Type |
| --- | --- |
| 36 | MPS6515 |
| 42 | MPS6515 |
| 44 | MPS6518 |
| 46 | MPS6518 |
| 48 | MPS6532 |
| 50 | 2N4278 |

| Battery: | Voltage |
| --- | --- |
| 34 | 12 volts |

FIG. 6 is a typical schematic of a complete electrical brake control system incorporating this invention. When no force is applied to sensor 18 and the manual control is not activated, the sensor 18 and the manual control variable resistor 26 are at minimum resistance. The voltage at the base of transistor 36 is very nearly equal to the voltage of battery 34, because rate adjustment resistor 38 and resistor 40 are of much greater value than the minimum value of the sensor 18 and variable resistor 26. Initially, transistors 36 and 42 are conducting and transistors 44, 46, 48 and 50 are not conducting. As either the resistance of sensor 18 or the variable resistor 26 is increased in value, the voltage at the base of transistor 36 decreases. The lowest voltage that transistor 36 base can decrease to is limited by diode 52 and potentiometer 54. As will be seen as the operation of the remainder of the circuit functions are related, the lowest voltage limit at the base of transistor 36 determines the maximum average voltage applied to the trailer electric brakes 16. Therefore, the function of potentiometer 54 is to allow the tractor operator to preset the maximum voltage applied to the trailer brakes 16 to prevent the trailer wheels from locking, which can happen if the voltage applied to the trailer brakes 16 is excessive. The value of rate adjustment resistor 38 will control the voltage at the base of transistor 36 relative to the resistance of the sensor 18 or manual control variable resistor 26. If resistance 38 is increased, then sensor 18 resistance must be increased to obtain the same voltage at the base of transistor 36. To increase the resistance of sensor 18, greater force must be applied to it and to the brake pedal 12. Therefore, rate adjustment resistor 38 controls the relative braking between tractor 10 and trailer 14, and allows adjustment of the relative braking between tractor 10 and trailer 14.

As the voltage at the base of transistor 36 decreases, caused by the increase in the resistance of the sensor 18 or variable resistance of manual control 26, the voltage at the base of transistor 44, connected to the emitter of transistor 36 by resistors 56 and 58, will also decrease, turning on transistor 44. The values of resistors 56 and 58 are selected to insure that transistor 44 is off when sensor 18 and manual control resistance 26 are at minimum value. (See table) When transistor 44 is on, relay coil 60 will be energized, closing relay contacts 62. This applies the battery 34 to the stop lights 64. Transistor 44 also causes transistors 46, 48 and 50 to conduct by supplying base current via resistor 66 to transistor 46. Transistors 42 and 46, resistors 66, 68, 70 and 72, and capacitors 74 and 76 form a free running multivibrator circuit which free runs as soon as transistor 44 conducts. The emitter current of transistor 46, which is limited by resistor 72, flows through the base-emitter of transistor 48, saturating transistor 48. The collector current of transistor 48, limited by resistor 78, flows mainly through the base-emitter of transistor 50, saturating transistor 50. Resistor 80 provides a leakage current path for transistor 50 to prevent thermal runaway. The collector current of the transistor flows through the electric brakes 16. Diodes 82 allows current to flow in the reverse direction. This reverse current occurs when transistor 50 turns off and the wiring to the electric brakes 16, and the electric brakes 16 are somewhat inductive. Reverse current also occurs when emergency switch 28 is opened. For component values of transistors and resistors, see the table above.

The free running multivibrator has a duty cycle of 0.05; that is, transistor 46 is on 5 percent of the time and transistor 42 is on 95 percent of the time when the voltage at the base of transistor 36 has decreased just enough to turn on transistor 44. At this time, the average voltage applied to the electric brakes 16 is 5 percent of the battery voltage. As the voltage at the base of transistor 36 decreases, the multivibrator duty cycle increases, and the average voltage applied to the electric brakes 16 increases. The time period in which transistor 42 is off increases as the voltage at the base of transistor 36 decreases, because less current flows through resistor 70 to recharge capacitor 74. The time period in which transistor 36 decreases because transistor 46 is not cut off.

As indicated previously, the manual control 20 could be incorporated into the amplifier package 22. Conversely, the rate adjustment resistor 38, potentiometer 54, and diode 52 could all or in part be included in the manual control 20. It should also be noted that the sensor 18 with the conductive resin 23 and/or the manual control variable resistance 26 could be of maximum resistance normally with their resistance decreasing when activated by pressure. In this case, they would be interchanged circuitwise with resistance 38 and 40, with the resulting circuit function unchanged.

With the present invention the braking system is independent of the tractor braking system; and uses all solid state devices with no switches or contactors operable in the braking functions. By independence of the tractor braking system and the trailer braking system, is meant that in the case of the automobile, it has a conventional braking system, including a brake pedal and the relatively conventional braking equipment for the purpose of applying the brakes to the wheels of the vehicle itself. The trailer braking system here disclosed which is set forth in diagrammatic form in FIG. 6 includes the electrical circuit diagram for operating the electromagnetic actuated brakes on the wheels of the trailer. The pressure force element 18 located on the brake pedal of the tractor creates a relationship between the two systems in that there is a manual means to vary the trailer braking system thereby changing it relative to the tractor braking system, but they are independent systems with a conventional hydraulic brake system on the tractor and an electrical type of system for the trailer brakes, having independent sources of power for each system.

On the feature that there are only solid state devices and no switches or contractors within the braking functions, such is disclosed on consideration of FIG. 6, in the adjustment features of components 18, 26, 38 and 54, which are manual adjustment, as well as switches 62 and 28 and therefore all of these types of components are for operation to condition the system and are not varied during the time that the actual braking is taking place. At that time, only the components such as nonadjustable resistors, transistors and capacitors are in use.

In the present system a minimum of power is used and a minimum of heat is generated, for the duty cycle of the voltage applied to the brakes is varied, rather than varying a voltage dropping resistance in series with the electric brakes and battery as in conventional systems. The heat generated is low because the voltage drop across the electric brake driving transistor 50 (See FIG. 6) is very low at the time current is flowing through it and the electric brake actuating circuit. By the use of a nonyielding sensor 18 of minimum thickness on top of the tractor brake pedal, with the adjustments of maximum braking and relative rate, first accomplished by a potentiometer 54 and the rate adjustment resistor 38, as shown in FIG. 6, the tractor operator needs thereafter only to actuate the brakes of the tractor normally to effect safe simple braking of a tractor-trailer assembly, inasmuch as the entire system when adjusted manually is automatically effective upon foot pressure on the force sensor 18 carried on brake pedal 12.

With a simple adjustment of potentiometer 54, within reach of the tractor operator, the operator can adjust the maximum braking for whatever trailer he is towing to prevent trailer wheel brake locking and possible skidding or inefficient braking. The operator can also adjust the braking of the trailer relative to the braking of the tractor for safe nonskidding stops. Provision is made in the system to activate the stop lights of both tractor and trailer with either foot or hand operation even if the tractor stop light switch is faulty and whether or not a trailer is being towed. Manual control is provided to allow braking of the trailer in the event of failure of the sensor, and an emergency switch 28 is provided in the event of failure of the remainder of the braking system to apply full battery voltage to the electric trailer brakes.

While only one embodiment of the present braking system is disclosed herein, various changes and modifications may be made without departing from the scope of the invention.

I claim:

1. In a control system for trailer wheel brakes of a tractor-trailer assembly:

a first brake power source connection on the tractor;

a brake pedal on the tractor actuable to apply said tractor brakes thru said first power source connection;

a second brake power source connection independent of said first power source connection for applying said trailer wheel brakes;

a multicomponent electrical control circuit intermediately connected between said second power source and said trailer brakes;

a variable resistance component of said multicomponent circuit mounted on said brake pedal responsive to variations in pressure applied to said variable resistance component connected to vary voltage output thru said circuit and thereby to regulate actuation of said trailer brakes; and means responsive directly to the mechanical force applied to actuate said brake pedal to also actuate said variable resistance component.

2. The control system of claim 1 wherein said variable resistance component comprises:

a variable resistance material whose resistance is a function of pressure thereon;

a pair of conductive plates with said variable resistance material positioned therebetween;

a pair of conductive wires attached one to each of said plates for connection to said electrical control circuit; and means to mount said pairs of plates with said variable resistance therebetween in position to receive the mechanical force to thereby vary resistance from one plate to the other through said variable resistance material.

3. The control system of claim 1 wherein a manually adjustable resistance in said control circuit limits the maximum voltage and current for actuating said trailer brakes.

4. The control system of claim 3 in which said circuit includes a transistor, and a diode and a potentiometer control the voltage at the base of said transistor to determine the maximum average voltage applied to the trailer wheel brakes.

5. The control system of claim 4 wherein another manually adjustable resistance controls the braking of the trailer relative to the braking of the tractor.

6. The control system of claim 1 wherein means are provided to vary voltage thru said circuit independent of said variable resistance component.

7. The control system of claim 6 wherein a major portion of the components of said control circuits is mounted adjacent the driver, including the said means to vary voltage thru the circuit independent of said variable resistance component.

8. In a tractor vehicle having a brake pedal, a multicomponent electrical circuit having means to vary and control voltage and current output therethrough:

a variable resistance material whose resistance is a function of pressure thereon;

a pair of conductive plates with said variable resistance material positioned therebetween;

a pair of conductive wires attached one to each of said plates for connection to said electrical circuit;

means to mount said pairs of plates with said variable resistance therebetween in position on the brake pedal for actuation by direct mechanical pressure exerted by the driver of the tractor vehicle to vary the resistance from one plate to the other through variable resistance material and thereby to actuate the tractor brakes;

an adjacent transistor in said circuit, the lowest voltage limit at the base of which determines the maximum average voltage at the output of said circuit; and a diode and potentiometer adjustable to control the voltage at the base of said adjacent transistor whereby maximum voltage at the output of said circuit may be preset.